July 21, 1964 M. I. GASPER 3,142,055
TRANSLATOR CIRCUIT
Filed May 11, 1962
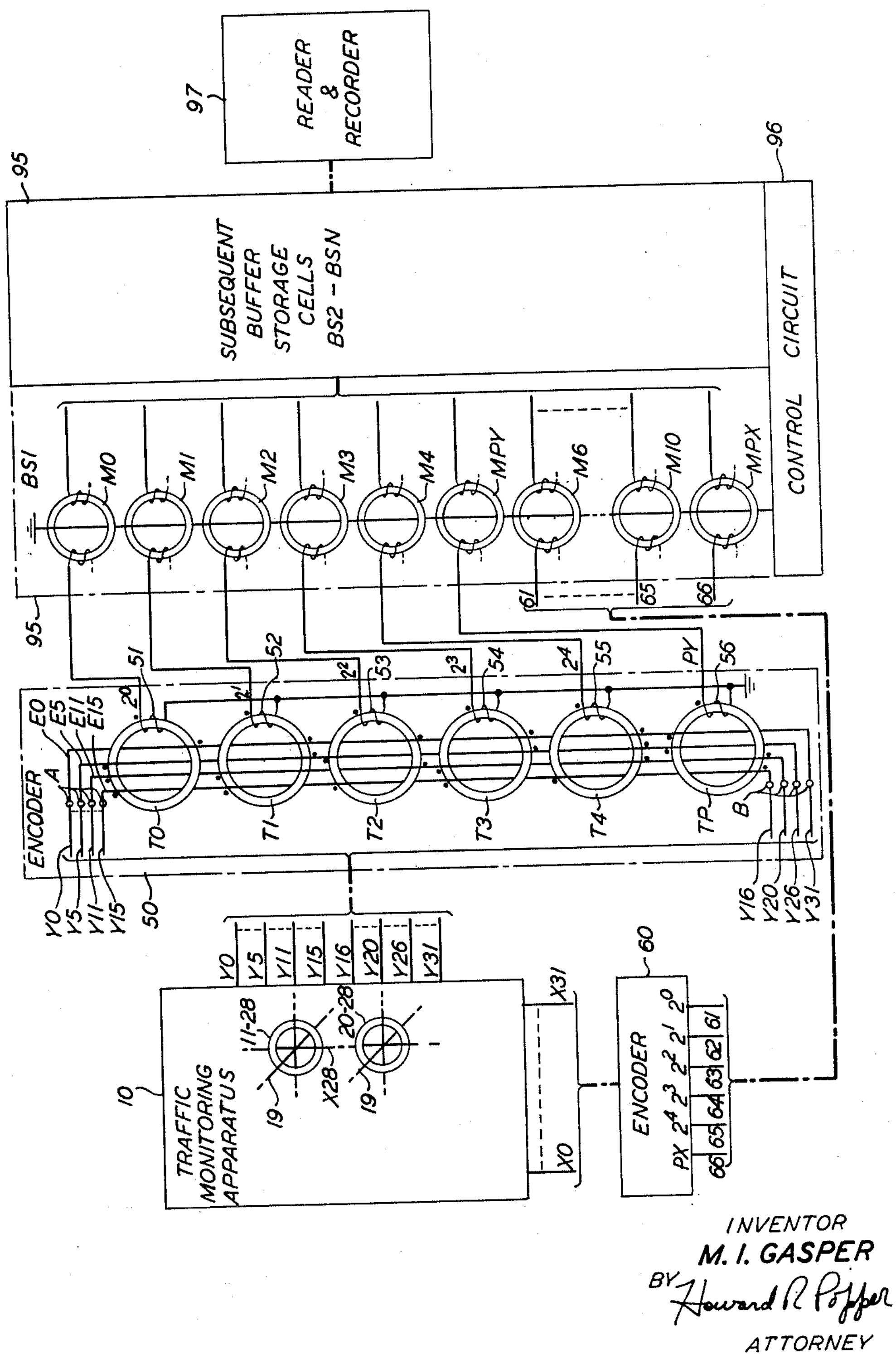
INVENTOR
M. I. GASPER
BY Howard R Popper
ATTORNEY United States Patent Office 3,142,055

Patented July 21, 1964

3,142,055

TRANSLATOR CIRCUIT

Melvin I. Gasper, Champaign, Ill., assignor to Bell Telephone Laboratories, Incorporated, New York, N.Y., a corporation of New York Filed May 11, 1962, Ser. No. 194,023
9 Claims. (Cl. 340—347)

This invention relates to translator circuits and, more particularly, to improvements in translator circuits for transfering information from one of a plurality of input conductors to one or more of a plurality of output conductors.

Translator circuits are basically devices for detecting input information in a first coded form and providing predetermined output information in a second coded form. The correspondence between the input and output information, that is, the translation relationship, is stored in the translator memory. In applications contemplated by the present invention, the translation relationship is one of code conversion to translate input information represented by one of a plurality of input circuits, or codepoints, to output multidigit binary equivalents. Such code translation circuits of the type referred to as ring translators are useful generally in telephone switching and related fields, and typically comprise a plurality of transformer cores through which individual input conductors are selectively threaded in accordance with a binary code uniquely identifying each input conductor. Thus, a signal appearing on a selected input conductor produces a resultant magnetic flux in only those cores through which the conductor is threaded, thereby providing an equivalent binary output corresponding to the selected input conductor. This type of translator circuit is disclosed, for example, in T. L. Dimond Patents No. 2,614,176, issued on October 14, 1952, and No. 2,657,272, issued on October 27, 1953.

The major problems encountered in the use of ring translator circuits relate to the effects of induced currents in the nonselected input conductors and to the effects of noise on the input conductors. With respect to the former, in particular, the magnetic flux produced in the transformer cores threaded by a selected input conductor induces currents in the remaining, nonselected input conductors in a direction opposite to the signal appearing on the selected conductor. These opposing currents are detrimental to the operation of the translator circuit in that they produce significant variations in the magnitude of the output signals from the several transformer cores. One solution normally employed to alleviate this problem is to connect diodes in circuit with each of the input conductors, which diodes are poled in the proper direction to pass only the input signals. Though satisfactory in operation, this and other methods employed to solve the problems related to the effects of induced currents and noise have increased the size and cost of the translator circuit.

Accordingly, it is an object of this invention to provide a simple, compact and economical translator circuit to accurately translate information from one of a plurality of input codepoints to an equivalent multidigit output.

It is a further object of this invention to provide an improved ring translator circuit which is substantially insensitive to the effects of noise and induced currents appearing on the input conductors.

Another object of this invention is to provide a ring translator in which the number of input conductors which must be selectively threaded through the transformer cores is substantially reduced.

An illustrative application in the telephone art in which the present code translation circuit may be employed advantageously is in conjunction with traffic data monitoring apparatus utilized to monitor a plurality of units of telephone equipment, e.g., markers, senders, trunks, etc. A principal type of traffic data accumulated by such monitoring apparatus relates to telephone equipment usage in terms of traffic volumes, or peg counts. Peg count traffic data is obtained by connecting monitoring apparatus to individual control leads emanating from the various units of telephone equipment to be observed. When a unit of equipment assumes a predetermined condition, such as through seizure for use, a signal appears on the individual control lead therefrom. A count of the signals appearing on a control lead during a period of observation indicates the volume of seizures of the particular equipment unit for that period. To eliminate the need for intervening manual or clerical processes, it is desirable to accumulate and record these signals in a form suitable for direct processing and summarization by automatic data processing equipment. However, the signals from the various units of equipment being monitored are electrically indistinguishable and cannot be directly recorded on a storage medium, but rather must be encoded in some manner to identify each signal as to its respective origin. For this purpose, an encoder is interposed between the monitoring apparatus and the recording apparatus. The encoder functions to identify each signal directed thereto from the monitoring apparatus and provides an equivalent binary code notation particularly designating the unit of equipment from which the signal obtained. This equivalent code notation is then recorded for subsequent processing by automatic data processing equipment.

In accordance with a specific embodiment of this invention, wherein the above and other objects are attained, the encoder comprises a plurality of transformer cores each having an output winding thereon and a plurality of input leads threaded therethrough. The two ends of each input lead are respectively connected to a pair of input codepoints uniquely associated therewith. Each input lead is threaded through the plurality of transformer cores on a single-turn basis in accordance with a binary code and in a manner so as to take advantage of the complementary nature of binary numbers. More particularly, each input lead is threaded through each transformer core such that a signal applied to the codepoint connected to one end of the lead is reflected through the transformer cores to produce a first binary output notation uniquely identifying that codepoint; and a like signal applied to the codepoint connected to the other end of the same input lead is reflected through the transformer cores to produce a second binary output notation uniquely identifying the latter codepoint. The second output notation is the binary complement of the first output notation. Thus, by arbitrarily associating the individual codepoints with particular equipment units being monitored, signals applied thereto from the monitoring apparatus are reflected through the transformer cores to provide equivalent binary notations uniquely identifying the unit of equipment from which the signal derived.

An important advantage of this complementary manner of threading the input leads through the transformer cores and the double-ended manner of effecting the operation of the translator is that the effects of noise and induced currents are essentially eliminated, thereby providing the signals on the output windings of the transformer cores at a relatively constant potential level. Further, the number of input leads and circuit components required is reduced considerably.

Therefore, a feature of this invention is a translator circuit which is responsive to like signals applied to opposite ends of an input lead in circuit therewith to provide respective complementary binary outputs.

More particularly, it is a feature of this invention that a translator circuit comprise a plurality of cores each having an output winding thereon, a plurality of input leads inductively linking discrete combinations of the plurality of cores in a first direction and inductively linking the remainder of the plurality of cores in the opposite direction, and first and second input circuits individually associated with each of the input leads for applying signals thereto to induce respective complementary outputs on the output windings.

The above and other objects and features of the present invention may be better understood upon consideration of the following detailed description and the accompanying drawing which shows an illustrative embodiment of a translator circuit according to the principles of my invention employed in conjunction with traffic data measurement apparatus.

Reference is now made to the drawing wherein an illustrative circuit arrangement for monitoring traffic data indications from a plurality of telephone equipment units and for encoding and recording equivalent binary notations thereof uniquely identifying the equipment units from which the indications obtain is depicted. The indications from the various equipment units are detected by traffic monitoring apparatus 10 which provides corresponding output pulses to respective encoders 50 and 60. Encoders 50 and 60 are operative in response to individual pulses directed thereto from traffic monitoring apparatus 10 to provide equivalent binary code notations to reader and recorder 97 for recording on a storage medium, e.g., magnetic tape. Traffic monitoring apparatus 10 may advantageously comprise circuitry such as described in the copending Shapiro-Shaw patent application Serial No. 194,065, filed on even date herewith, and is depicted generally in symbolic form herein with only so much detail as is necessary for a complete understanding of the present invention.

As fully disclosed in the above-identified Shapiro-Shaw patent application, traffic monitoring apparatus 10 comprises a matrix array of magnetic cores, arranged in coordinate rows and columns such that each core is defined by a row and column coordinate. For example, magnetic core 11–28 in traffic monitoring apparatus 10 is located at the intersection of row 11 and column 28; similarly, core 20–28 is located at the intersection of row 20 and column 28. For purposes of the present description, traffic monitoring apparatus 10 is depicted as comprising a 32 by 32 matrix of magnetic cores, a number sufficient to monitor 1024 equipment units. Each magnetic core is threaded by a coordinate row and column conductor, row conductors X0 through X31 threading the respective rows and column conductors Y0 through Y31 threading the respective columns. In addition, an individual input winding 19 is threaded through each magnetic core and is connected to an associated unit of equipment to be monitored. When the associated unit of equipment assumes a predetermined condition being monitored, such as through seizure for use, an indication appears on winding 19 which sets the magnetic core. The setting of a magnetic core in traffic monitoring apparatus 10 produces an output pulse on the coordinate row and column conductors threaded therethrough. Responsive to a pulse on a row and a column conductor, encoders 50 and 60 generate an equivalent binary notation uniquely identifying the set magnetic core, and thus the associated unit of equipment being monitored. The magnetic core is thereafter reset to await the appearance of a subsequent indication from the associated equipment unit.

The equivalent binary code notations from encoders 50 and 60 are applied through buffer store 95 to reader and recorder 97 for recording on a final storage medium for subsequent processing by automatic data processing equipment. Buffer store 95, and control circuit 96 therefor, may comprise circuitry known in the art, such as the illustrative magnetic core circuitry shown in the drawing, for receiving data at a random rate and for asynchronously advancing the data along a group of successive storage cells BS1 and BS2–BS$n$ to recorder 97 at a proper rate for recording. Suitable buffer store and control circuitry is described, for example, in D. H. Barnes patent application Serial No. 1,602, filed January 11, 1960, now Patent 3,099,819, issued July 30, 1963. Recorder 97 may comprise well-known circuitry for recording or punching data on a storage medium such as magnetic tape or paper tape.

In accordance with the principles of the present invention, encoder 50 comprises a plurality of transformer cores T0 through T4 and TP, each core corresponding to a binary bit slot in the equivalent binary output notations provided to buffer store 95. Each of transformer cores T0 through T4 and TP has a respective output winding 51 through 56 thereon, one end of which is connected to ground. The other end of each of output windings 51 through 56 is connected to the input winding of a respective one of magnetic cores M0 through MPY in buffer storage cell BS1. Output windings 51 through 56 may be multiple turn windings, as shown, to provide the desired output potential levels. Transformer cores T0 through T4 correspond to information bit slots in the binary output notations, the numeral adjacent the output windings of each core indicating the relative weight of a binary bit of information appearing therein. Transformer core TP is provided in the illustrative embodiment for parity-checking purposes and corresponds to a parity bit slot in the output notation, as indicated by the designation PY adjacent output winding 56.

A plurality of encoder input leads E0 through E15, of which only leads E0, E5, E11 and E15 have been shown in the drawing for purposes of clarity and to facilitate description of the invention, are each threaded through transformer cores T0 through T4 and TP in accordance with conventional binary code and in a manner so as to take advantage of the complementary nature of binary numbers. More particularly, each input lead is threaded through each transformer core on a single-turn basis in a manner such that a signal applied to one end of an input lead is reflected through the transformer cores to produce a first discrete binary notation, inclusive of parity bit, on output windings 51 through 56; and a like polarity signal applied to the other end of the same input lead produces a second discrete binary notation on output windings 51 through 56, inclusive of parity bit, which is the complement of the first notation. For each binary output notation, transformer core TP provides a parity bit so as to maintain odd parity in the illustrative embodiment. By reversing the direction of threading each of the input leads through core TP, even parity may be provided.

The respective ends of input leads E0 through E15 have been designated terminals A and B; and a dot convention has been employed with respect to the input leads through each of cores T0 through T4 and TP, and with respect to the output windings 51 through 56, to facilitate an understanding of the operation of encoder 50. Thus, a signal applied to the dotted terminal of the input lead through a particular transformer core will produce a signal of like polarity at the dotted terminal of the output winding thereof. For example, a positive polarity signal applied to the dotted terminal of an input lead induces a clockwise flux in the particular transformer core to provide a positive-going signal from the dotted terminal of the core output winding, representative of a bit of one binary character, e.g., binary "1," in the bit slot corresponding to that core. A positive signal applied to the undotted terminal of the same input lead induces a counterclockwise flux to produce a positive-going signal from the undotted terminal of the output winding, representative of a bit of the other binary character, e.g., binary "0." The following table illustrates the correspondence between signals applied to terminal A and to terminal B of input leads E0 through E15 and the binary output signals from transformer cores T0 through T4 and TP.

*Table I*

| Input Lead | Signal Applied to Terminal A | | | | | | Signal Applied to Terminal B | | | | | |
|---|---|---|---|---|---|---|---|---|---|---|---|---|
| | Core Output | | | | | | Core Output | | | | | |
| | TP | T4 | T3 | T2 | T1 | T0 | TP | T4 | T3 | T2 | T1 | T0 |
| E0 | 1 | 0 | 0 | 0 | 0 | 0 | 0 | 1 | 1 | 1 | 1 | 1 |
| E1 | 0 | 0 | 0 | 0 | 0 | 1 | 1 | 1 | 1 | 1 | 1 | 0 |
| E2 | 0 | 0 | 0 | 0 | 1 | 0 | 1 | 1 | 1 | 1 | 0 | 1 |
| E3 | 1 | 0 | 0 | 0 | 1 | 1 | 0 | 1 | 1 | 1 | 0 | 0 |
| E4 | 0 | 0 | 0 | 1 | 0 | 0 | 1 | 1 | 1 | 0 | 1 | 1 |
| E5 | 1 | 0 | 0 | 1 | 0 | 1 | 0 | 1 | 1 | 0 | 1 | 0 |
| E6 | 1 | 0 | 0 | 1 | 1 | 0 | 0 | 1 | 1 | 0 | 0 | 1 |
| E7 | 0 | 0 | 0 | 1 | 1 | 1 | 1 | 1 | 1 | 0 | 0 | 0 |
| E8 | 0 | 0 | 1 | 0 | 0 | 0 | 1 | 1 | 0 | 1 | 1 | 1 |
| E9 | 1 | 0 | 1 | 0 | 0 | 1 | 0 | 1 | 0 | 1 | 1 | 0 |
| E10 | 1 | 0 | 1 | 0 | 1 | 0 | 0 | 1 | 0 | 1 | 0 | 1 |
| E11 | 0 | 0 | 1 | 0 | 1 | 1 | 1 | 1 | 0 | 1 | 0 | 0 |
| E12 | 1 | 0 | 1 | 1 | 0 | 0 | 0 | 1 | 0 | 0 | 1 | 1 |
| E13 | 0 | 0 | 1 | 1 | 0 | 1 | 1 | 1 | 0 | 0 | 1 | 0 |
| E14 | 0 | 0 | 1 | 1 | 1 | 0 | 1 | 1 | 0 | 0 | 0 | 1 |
| E15 | 1 | 0 | 1 | 1 | 1 | 1 | 0 | 1 | 0 | 0 | 0 | 0 |

It will be appreciated from the above that an individual input lead is threaded through a discrete combination of transformer cores T0 through T4 in a first directional sense, each core of the combination corresponding to a binary "1" in a first binary designation identified with the input lead; and the lead is threaded through the remainder of the cores in the opposite directional sense, each core of the remainder corresponding to a binary "1" in a second binary designation identified with the input lead. The first and second designations identified with each input lead, therefore, are binary complements. Thus, pairs of input circuits having designations which correspond to, or which are arbitrarily assigned, complementary binary designations may be advantageously connected to terminals A and B, respectively, of input leads E0 through E15.

Accordingly, in the illustrative traffic measurement circuit shown in the drawing, row conductors Y0 through Y31 are connected to encoder 50 in pairs, each pair including two row conductors having complementary binary designations in accordance with their respective locations in the magnetic core matrix of traffic monitoring apparatus 10. For example, row conductor Y0 is paired with row conductor Y31, Y5 is paired with Y26, Y11 is paired with Y20, and Y15 is paired with Y16. The paired row conductors are connected to opposite ends, terminals A and B, of respective ones of input leads E0 through E15. Encoder 60, shown in block diagram form in the drawing, is essentially identical with encoder 50 and comprises a plurality of transformer cores threaded by input leads in the manner described above. Column conductors X0 through X31 are similarly connected to the input leads of encoder 60 in complementary pairs, each pair including two column conductors having complementary binary designations in accordance with their location in the matrix of traffic monitoring apparatus 10. The other ends of the paired row conductors and the paired column conductors may be respectively interconnected and advantageously left floating electrically free from ground. Output windings 61 through 66 from encoder 60 are each connected to the input winding of a respective one of magnetic cores M6 through M10 and MPX in buffer storage cell BS1.

Assuming, by way of example, that the unit of equipment associated with magnetic core 11–28 is seized and that an indication thereof on winding 19 sets core 11–28, the operation of the illustrative embodiment of encoder 50 will now be considered. The setting of core 11–28 provides a positive polarity pulse on row conductor Y11 to encoder 50 and a positive polarity pulse on column conductor X28 to encoder 60. The pulse on row conductor Y11 is directed through terminal A along encoder input lead E11, inducing a clockwise magnetic flux in transformer cores T0, T1 and T3 and a counterclockwise flux in transformer cores T2, T4 and TP. The flux induced in cores T0, T1 and T3 produces a positive polarity signal at the dotted terminal of each of output windings 51, 52 and 54, which is directed to the input winding of the respective one of magnetic cores M0, M1 and M3 in buffer storage cell BS1. The signals on output windings 51, 52 and 54 each represent a binary "1" in the corresponding information bit slot in the equivalent binary output notation, and they operate to set each of magnetic cores M0, M1 and M3 in a manner well known in the art. The flux induced in transformer cores T2, T4 and TP produces a negative polarity signal at the dotted terminal of each of output windings 53, 55 and 56, which is directed to the input winding of the respective one of magnetic cores M2, M4 and MPY in buffer storage cell BS1. The negative signals on output windings 53, 55 and 56 each represent a binary "0" in the corresponding information and parity bit slots in the equivalent binary output notation, and leave magnetic cores M2, M4, and MPY in the unset condition. Accordingly, the pulse on row conductor Y11 applied to terminal A of input lead E11 produces a binary output notation "001011," inclusive of parity bit, uniquely identifying that row conductor.

In a similar manner, the setting of magnetic core 20–28 in traffic monitoring apparatus 10 produces a positive polarity pulse on row conductor Y20 and column conductor X28. The pulse on row conductor Y20 is directed through terminal B along encoder input lead E11, inducing the opposite, or complementary, pattern of magnetic flux in transformer cores T0 through T4 and TP. A counterclockwise magnetic flux is induced in transformer cores T0, T1 and T3 and a clockwise magnetic flux is induced in transformer cores T2, T4 and TP. The resultant output signals on output windings 51 through 56 represent the binary notation "110100," which is the binary complement of the output notation produced by a positive pulse applied to terminal A of encoder input lead E11.

The magnetic flux produced in cores T0 through T4 and TP by an input pulse on one of input leads E0 through E15 also induces currents in the remaining nonselected input leads. The currents induced in a nonselected input lead by the flux in each of the cores through which it is threaded are not all in a direction opposite to that of the input pulse on the selected lead, but rather they are determined by the direction of the flux induced in each of the cores and by the direction in which the nonselected lead is threaded therethrough. Thus, the effects of the currents induced in each of the nonselected leads tend to cancel out. Moreover, noise appearing at the various code points connected to the input leads is directed along the leads from both ends and the effects thereof tend to cancel.

What has been disclosed herein, therefore, is a simple and economical double-ended translator circuit for accurately transferring information from one of a plurality of input conductors to one or more of a plurality of output conductors, which translator circuit is substantially insensitive to the effects of noise and induced currents on the input conductors while requiring fewer components and less wiring. Although the above description has been directed to a specific illustrative embodiment and to an application in the telephone art, it will be apparent that the principles of the present invention are ideally suited to a wide range of applications. For example, magnetic cores may be employed instead of transformer cores by providing means for resetting between successive translations; and the input leads may be threaded through the cores in accordance with other complementary binary codes instead of conventional binary code as depicted in the drawing.

It is to be understood, therefore, that the above-described arrangements are merely illustrative of the application of the principles of my invention. Numerous other arrangements may be devised by those skilled in the art without departing from the spirit and scope of the invention.

What is claimed is:

1. An encoder comprising a plurality of transformer cores each having a winding thereon, a conductor inductively linked in one direction with a particular combination of said cores and inductively linked in the opposite direction with the remainder of said cores, first means for applying a signal to said conductor to induce voltages of a predetermined polarity in the windings individual to said particular combination of said cores, second means to applying a signal to said conductor to induce voltages of said predetermined polarity in the windings individual to said remainder of said cores, and means connected to each of said windings and responsive to voltages of said predetermined polarity.

2. An encoder comprising a plurality of transformer cores each having a winding thereon, a plurality of conductors each associated with a pair of a plurality of input sources, each conductor threading a discrete combination of said cores in a first direction and threading the remainder of said cores in a second direction, means for selectively connecting one of a pair of said input sources to the associated conductor to induce voltages of a predetermined polarity in the windings individual to the cores threaded by said conductor in said first direction, means for selectively connecting the other of said pair of input sources to said associated conductor to induce voltages of said predetermined polarity in the windings individual to the cores threaded by said conductor in said second direction, and means responsive to said voltages of said predetermined polarity.

3. An information transfer circuit comprising a plurality of transformer cores, a plurality of input conductors, each input conductor coupling a discrete combination of said cores in a first directional sense and coupling the remainder of said cores in the opposite directional sense, individual output windings coupling each of said cores, first input means for selectively applying an input potential to individual of said input conductors such that a first polarity potential is induced in the output windings coupling the discrete combination of said cores coupled by said individual input conductor and a second polarity potential is induced in the output windings coupling the remainder of said cores, second input means for selectively applying an input potential to said individual input conductors such that said second polarity potential is induced in the output windings coupling the discrete combination of said cores coupled by said individual input conductor and said first polarity potential is induced in the output windings coupling the remainder of said cores, and output means for discriminating between said first and said second polarity potential on said output windings.

4. An information transfer circuit comprising a plurality of transformer cores each having an output winding thereon, a plurality of input leads each inductively linked in one direction with a discrete combination of said cores and inductively linked in the opposite direction with the remainder of said cores, a plurality of first input signal terminals respectively connected to one end of said plurality of input leads, and a plurality of second input signal terminals respectively connected to the other end of said plurality of input leads.

5. An information transfer circuit comprising a plurality of input terminals, a plurality of output circuits each including coil means, and means connected to said input terminals for selectively providing particular patterns of magnetic flux inductively linking each of said coil means, said last-mentioned means including a plurality of transformer cores respectively coupled inductively with said coil means, and a plurality of conductors individually connected to discrete pairs of said input terminals, each of said conductors being inductively coupled to each of said cores in a directional sense determined in accordance with a binary code.

6. An information transfer circuit comprising a plurality of transformer cores each corresponding to a bit slot in a multibit binary output notation, a plurality of input conductors individually associated with respective first and second binary output notations, said first and second output notations being binary complements, and means for inductively coupling each of said conductors to each of said cores in accordance with said respective first and second binary output notations associated therewith, said conductors inductively coupled to said cores in a first directional sense to represent a bit of one binary character in said first associated output notation and inductively coupled to said cores in a second directional sense to represent a bit of said one binary character in said second associated output notation.

7. A translator circuit comprising a plurality of transformers each having an output winding thereon, a plurality of input circuits individually comprising an input winding on each of said transformers wound in one direction or another according to first and second code representations uniquely associated with individual of said input circuits, and means for respectively associating two discrete input signal sources with each of said input circuits such that a signal from one source induces said first code representation in said output windings and a signal from the other source induces said second code representation in said output windings.

8. A translator circuit in accordance with claim 7 wherein said signals from said one and said other input signal sources are of like polarity and are applied to opposite terminals of said input windings.

9. A translator circuit comprising a plurality of transformer cores each having an output winding thereon, a plurality of input leads inductively linking discrete combinations of said plurality of cores in one direction and inductively linking the remainder of said plurality of cores in the other direction, and first and second input means individually associated with opposite ends of each of said input leads for applying signals thereto to provide respective complementary outputs on said output windings.

References Cited in the file of this patent

UNITED STATES PATENTS

| | | |
|---|---|---|
| 3,015,813 | Tyrlich | Jan. 2, 1962 |
| 3,086,198 | Tate | Apr. 16, 1963 |